(12) United States Patent
Dipaolo

(10) Patent No.: US 8,752,316 B1
(45) Date of Patent: Jun. 17, 2014

(54) APPARATUS FOR IDENTIFYING STROLLERS

(71) Applicant: Jessica Dipaolo, East Hanover, NJ (US)

(72) Inventor: Jessica Dipaolo, East Hanover, NJ (US)

(*) Notice: Subject to any disclaimer, the term of this patent is extended or adjusted under 35 U.S.C. 154(b) by 0 days.

(21) Appl. No.: 13/922,383

(22) Filed: Jun. 20, 2013

Related U.S. Application Data

(60) Provisional application No. 61/758,342, filed on Jan. 30, 2013.

(51) Int. Cl.
*A44C 5/00* (2006.01)

(52) U.S. Cl.
USPC .............. 40/633; 40/320; 40/660; 40/661.12; 40/665; 280/647

(58) Field of Classification Search
USPC .............. 40/633, 320, 658, 660, 661.12, 665; 280/647
See application file for complete search history.

(56) References Cited

U.S. PATENT DOCUMENTS

| | | | |
|---|---|---|---|
| 4,680,882 A | 7/1987 | Watson, Jr. | |
| 4,901,462 A | 2/1990 | Wrigley | |
| D321,913 S | 11/1991 | Wolff | |
| 6,138,882 A * | 10/2000 | Buettner | 224/250 |
| 6,364,365 B1 | 4/2002 | Caplan | |
| 7,204,468 B2 * | 4/2007 | Kintzele et al. | 248/690 |
| D608,833 S | 1/2010 | Brodsky | |
| D627,827 S | 11/2010 | Rogers | |
| 7,896,297 B1 * | 3/2011 | Simone | 248/102 |
| 8,025,433 B2 * | 9/2011 | Comrada | 362/543 |
| 8,091,262 B2 * | 1/2012 | Poulokefalos | 40/661.05 |
| 8,172,270 B2 | 5/2012 | Rossing | |
| 2003/0136038 A1 * | 7/2003 | Durham | 40/593 |
| 2004/0111942 A1 | 6/2004 | Stonehocker | |
| 2009/0218246 A1 * | 9/2009 | Weidler | 206/457 |
| 2010/0025441 A1 * | 2/2010 | Blaney | 224/148.6 |
| 2011/0030256 A1 * | 2/2011 | Juliano | 40/633 |
| 2012/0233897 A1 * | 9/2012 | Gold et al. | 40/591 |

* cited by examiner

*Primary Examiner* — Gary Hoge
(74) *Attorney, Agent, or Firm* — Goldstein Law Offices, P.C.

(57) ABSTRACT

An apparatus for identifying a particular baby stroller in a crowd of parked strollers. The apparatus has at least one distinctive ornament for providing immediate recognition coupled to a band for attaching to a handle of a particular stroller in a visible position. The ornament has shiny trim for reflecting light, improving visibility. The ornament selectively couples to the band, allowing a first ornament to be exchanged with another ornament to selectively coordinate with a user's clothing. A plurality of apparatuses can be attached to the stroller to further ease immediate recognition of the particular stroller.

2 Claims, 12 Drawing Sheets

APPARATUS FOR IDENTIFYING STROLLERS

CROSS-REFERENCE TO RELATED APPLICATIONS

This application is a nonprovisional utility application of the provisional patent application Ser. No. 61/758,342, filed in the United States Patent Office on Jan. 30, 2013 and claims the priority thereof and is expressly incorporated herein by reference in its entirety.

TECHNICAL FIELD

The present disclosure relates generally to an apparatus for identifying baby strollers. More particularly, the present disclosure relates to an apparatus for identifying a particular baby stroller in a crowd of parked strollers.

BACKGROUND

Parents and caregivers take their small charges out of doors into play areas and public areas like shopping malls. For centuries parents have used wheeled devices to transport babies and young children outside the home rather than carry a child in their arms continuously during an outing.

Strollers, particularly the style referred to as an umbrella stroller, are particularly popular for transporting babies and young children. These strollers conveniently fold up for storage between uses.

Strollers are ubiquitous at playgrounds and shopping malls. Generally there is a parking area for the strollers so that are not in the way of any activities.

A handful of brands dominate the market so that in a stroller parking area there are often multiple strollers that look identical. Finding a particular stroller in the crowd is often difficult and time consuming as parents examine the wear and tear on a stroller or any personal item left underneath the seat to distinguish one stroller from another. Waiting impatiently is the small child who wants to sit in the stroller.

While this may be suitable for the particular purpose employed, or for general use, this is not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide immediate recognition of a particular stroller. Accordingly, an aspect of an example embodiment in the present disclosure provides an apparatus having a distinctive ornament for attaching to a particular stroller.

Another aspect of an example embodiment in the present disclosure is to provide a distinctive ornament for a stroller handle that attaches securely on the stroller handle. Accordingly, the present disclosure provides a band coupled to the ornament, the band an elastic strip securely attaching the ornament to the stroller.

A further aspect of an example embodiment in the present disclosure is to provide immediate recognition of a particular stroller in a crowd of strollers. Accordingly, an aspect of an example embodiment in the present disclosure provides an apparatus having a distinctive ornament attaching to a stroller handle in a visible position.

Yet another aspect of an example embodiment in the present disclosure is to provide a distinctive ornament that has improved visibility. Accordingly, the present disclosure provides an ornament having a shiny trim, the trim reflective of light for improved visibility.

The present disclosure describes an apparatus for identifying a particular baby stroller in a crowd of parked strollers. The apparatus has a distinctive ornament for providing immediate recognition coupled to a band for attaching to a handle of a particular stroller in a very visible position. The ornament has shiny trim for reflecting light, improving visibility. The ornament selectively couples to the band, allowing a first ornament to be exchanged with another ornament to coordinate with a user's clothing. A plurality of apparatuses can be attached to the stroller to further ease immediate recognition of the particular stroller.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
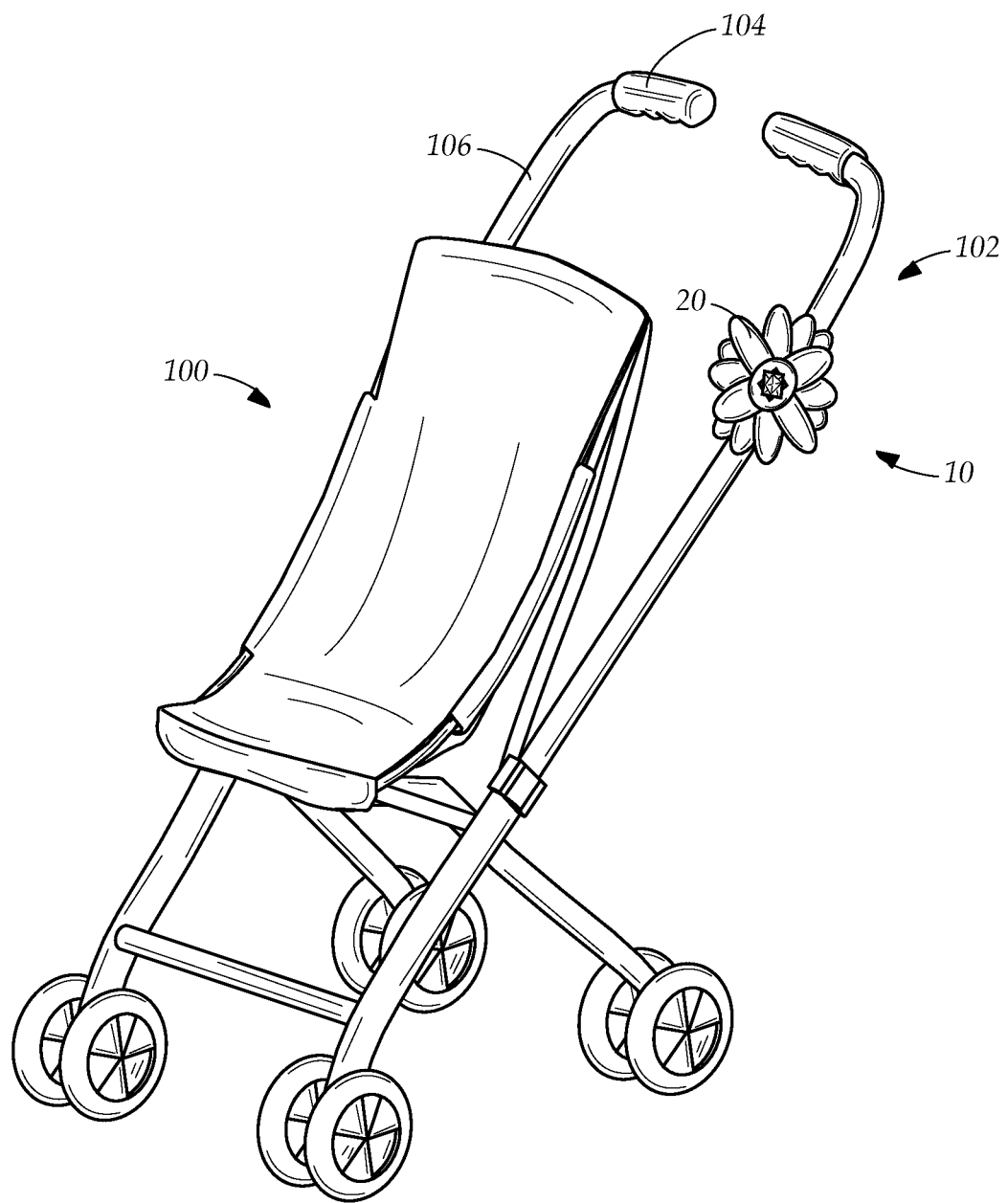
FIG. 1 is perspective view of a stroller with an apparatus for identifying a particular baby stroller.

FIG. 1 illustrates an apparatus for immediately identifying a stroller 100, the apparatus at a visible position on a handle 102 of a stroller. The apparatus 10 helps the stroller stand out in an area crowded with other strollers. Most strollers have at least one handle. Stroller handles generally are black, other colors limited by popularity at any given time. The apparatus 10 is operative for changing the appearance of the stroller handle 102, providing a distinctive visual cue for immediate recognition of a particular stroller in a crowd of strollers.

The apparatus 10 has at least one distinctive ornament 20 selected for identifying the stroller, the ornament situated in a visible position on the handle, the ornament operative for providing the immediate visual cue.

Figure 4:
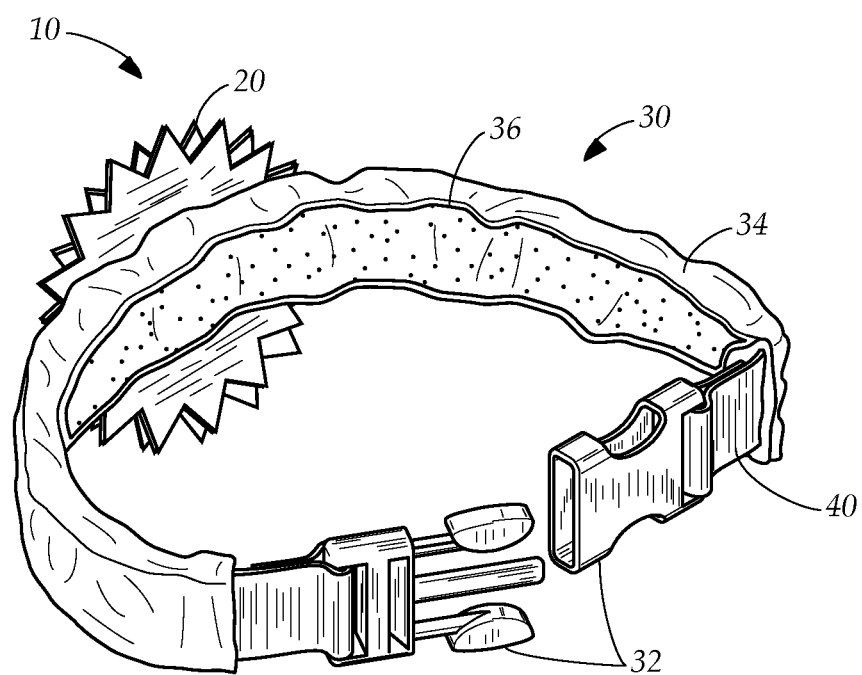
FIG. 4 is another example embodiment of the apparatus for identifying a stroller.

FIG. 4 shows an example embodiment of the apparatus 10. The ornament 20 couples to a band 30, the band operative for attaching the apparatus 10 to the stroller, the band situating the ornament in the visible position on the handle.

In the example embodiment in FIG. 4, the band 30 is an elastic strip 40, the elastic strip contracting around the handle at the visible position. In a further embodiment, the elastic strip has a clasp 32, and in a further embodiment, the clasp is selectively adjustable.

In the example embodiment in FIG. 4, the elastic strip 40 has a fabric cover 34 with an inside surface 36 having a rubberized layer operative for gripping the stroller handle.

Figure 6A:
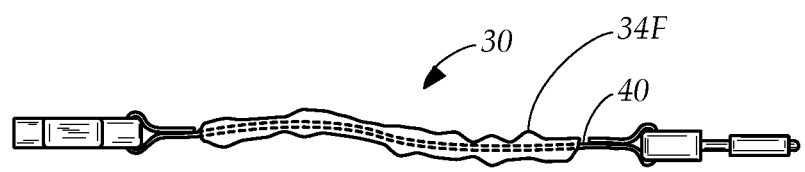
FIG. 6A is a top plan view of another example embodiment of the apparatus for identifying a stroller, a band in a contracted position.
Figure 6B:
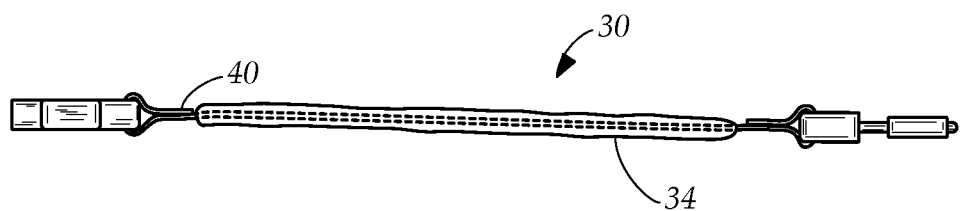
FIG. 6B, similar to FIG. 6A, is a top plan view of another example embodiment of the apparatus for identifying a stroller, the band in a stretched position.

FIG. 6A and FIG. 6B show the fabric layer 34 covering the elastic strip 40. When the strip is extended, the fabric layer 34 covers the strip as shown in FIG. 6B. When the elastic layer contracts as shown in FIG. 6A, for example, when attaching to the handle of the stroller, the fabric bunches up creating a distinctive frill 34F, further adding to the distinctive appearance of the apparatus 10.

In a further embodiment, the fabric cover on the elastic strip is brightly colored for improved visibility.

Figure 2:
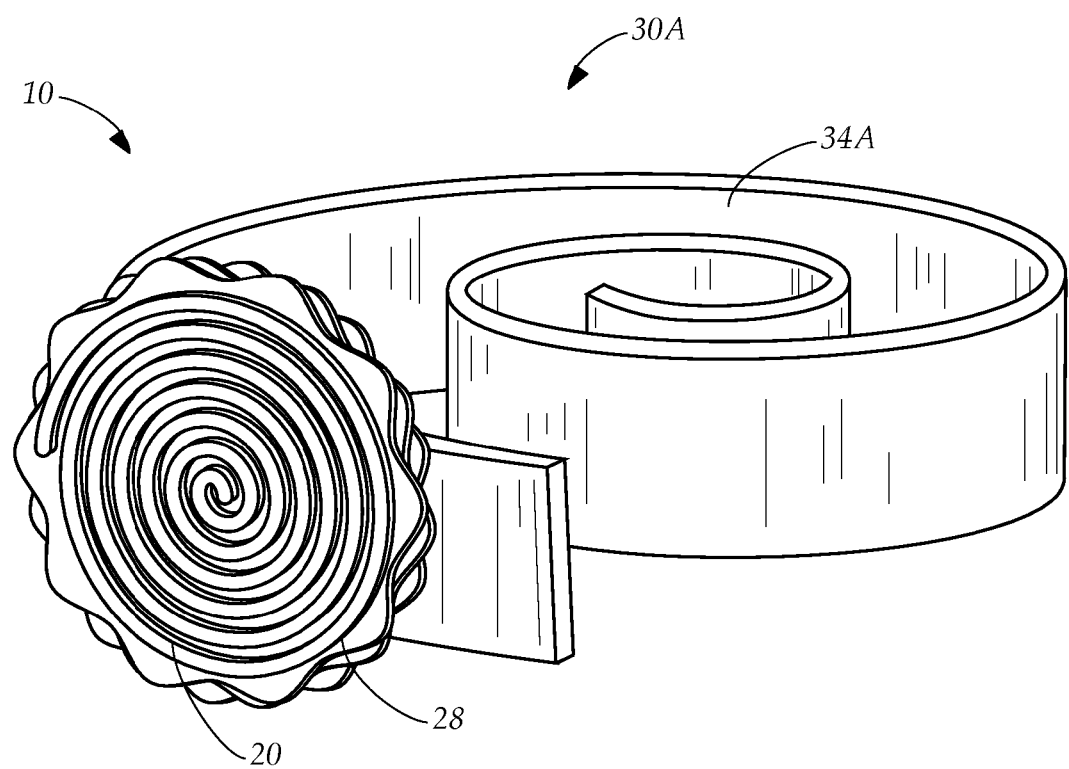
FIG. 2 is a perspective view of an example embodiment of an apparatus for identifying a stroller.

FIG. 2 illustrates a further example embodiment of the apparatus 10. The band 30A has a plurality of layered bistable spring bands sealed within a covering 34A. The spring bands are operative for coiling around the stroller handle; the tension of the spring bands is released within the band when applied to the handle. The spring bands are biased inwardly when coiling around the stroller handle.

Figure 3A:
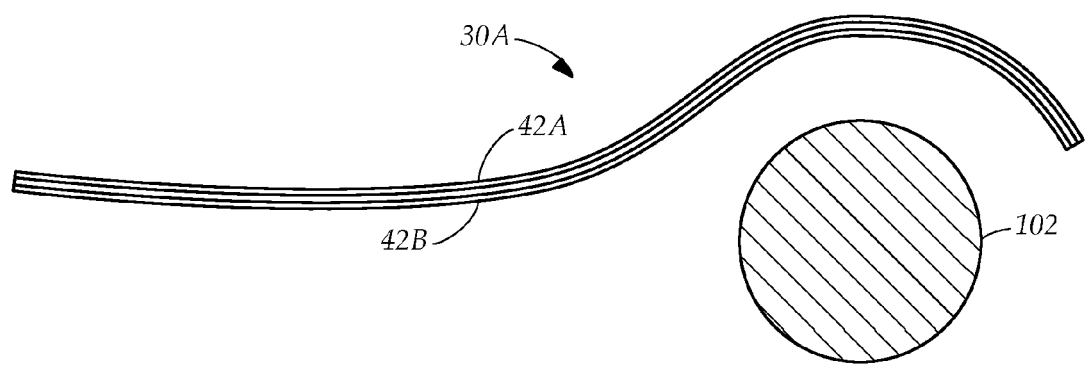
FIG. 3A is top plan view of the apparatus for identifying a stroller beginning to engage a stroller handle, shown in cross section.
Figure 3B:
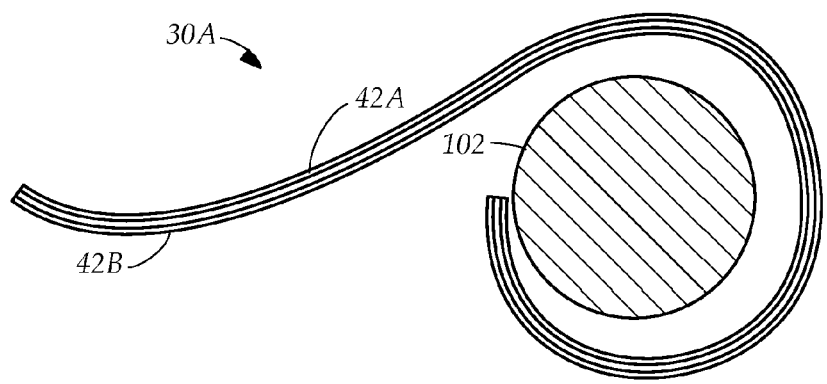
FIG. 3B, similar to FIG. 3A, is top plan view of the apparatus for identifying a stroller engaging the stroller handle, shown in cross section.
Figure 3C:
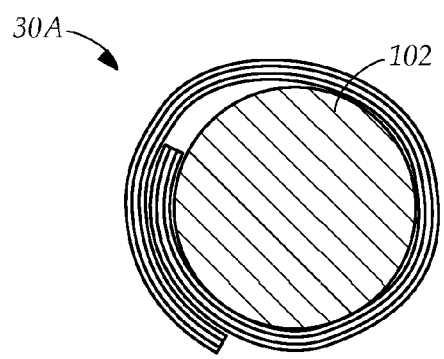
FIG. 3C, similar to FIG. 3B, is top plan view of the apparatus for identifying a stroller attached to the stroller handle, shown in cross section.

FIGS. 3A-3C illustrate how the spring bands coil around the handle. When the spring bands A, 42B are straight, there is tension in the spring bands. When the band 30A engages the handle 102, generally by slapping the handle, the tension releases and the spring bands 42 begin to coil, the inner spring band 42B having more tension, coils to a greater extent causing the band 30A to bias towards the handle 102. The tension released, the band 30A snugly coils around the handle 102.

In a further embodiment, the covering on the spring bands is brightly colored for improved visibility.

Referring to FIG. 2, the ornament 20 has a shiny trim 28 such as faux gems, reflective of light for improved visibility. The at least one ornament can be a flower, a flowers bunch, a badge with a cartoon image, a brooch, a plurality of beads or a plurality of faux gems. The ornament is only limited by imagination. The ornament can selectively coordinate with clothing, either the clothing worn by a caregiver or the clothing worn by a child occupying the stroller.

Figure 7A:
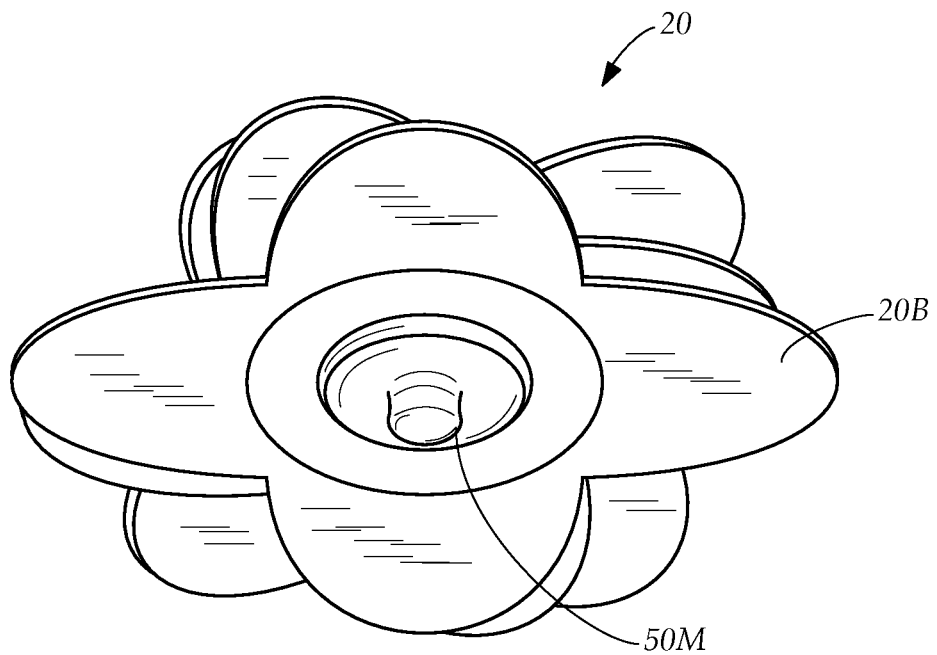
FIG. 7A is a bottom perspective view of an ornament.
Figure 7B:
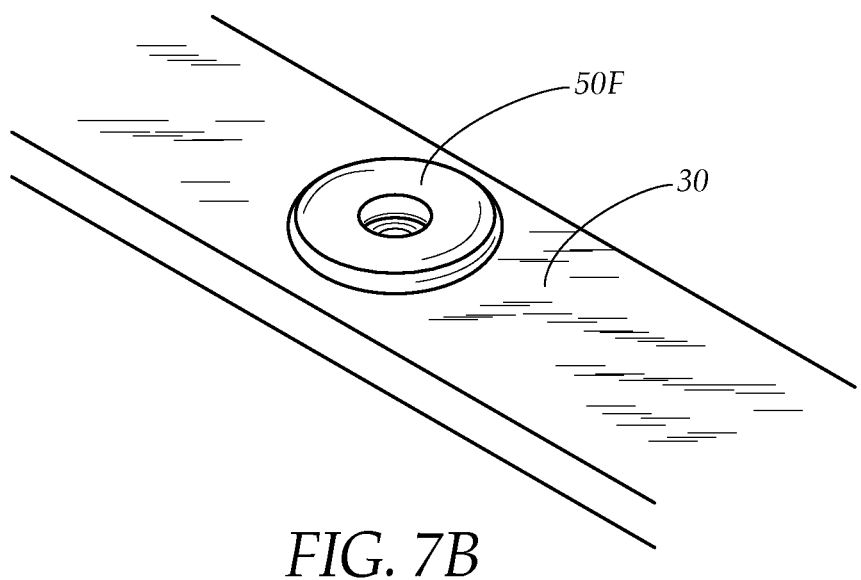
FIG. 7B is a top perspective view of the band.

The ornament selectively couples to the band by a fastener selected from the group of a hook and loop fastener, a snap, a clasp, a button, a pin and a clip. Referring to FIGS. 7A-7B, an example embodiment of the apparatus has the ornament having a back 20B with a first locking snap 50M, and the band 30 having a second locking snap 50F, the locking snap on the band of an opposing gender to the locking snap on the ornament. The ornament selectively couples to the band by coupling the locking snaps together and in a further embodiment, the snaps lock by turning the fastener into a locked position by rotating the ornament. It is understood that while the illustration shows the ornament having a male snap and the band having a female snap, that this is not a limitation and the snaps are functionally interchangeable.

Figure 8A:
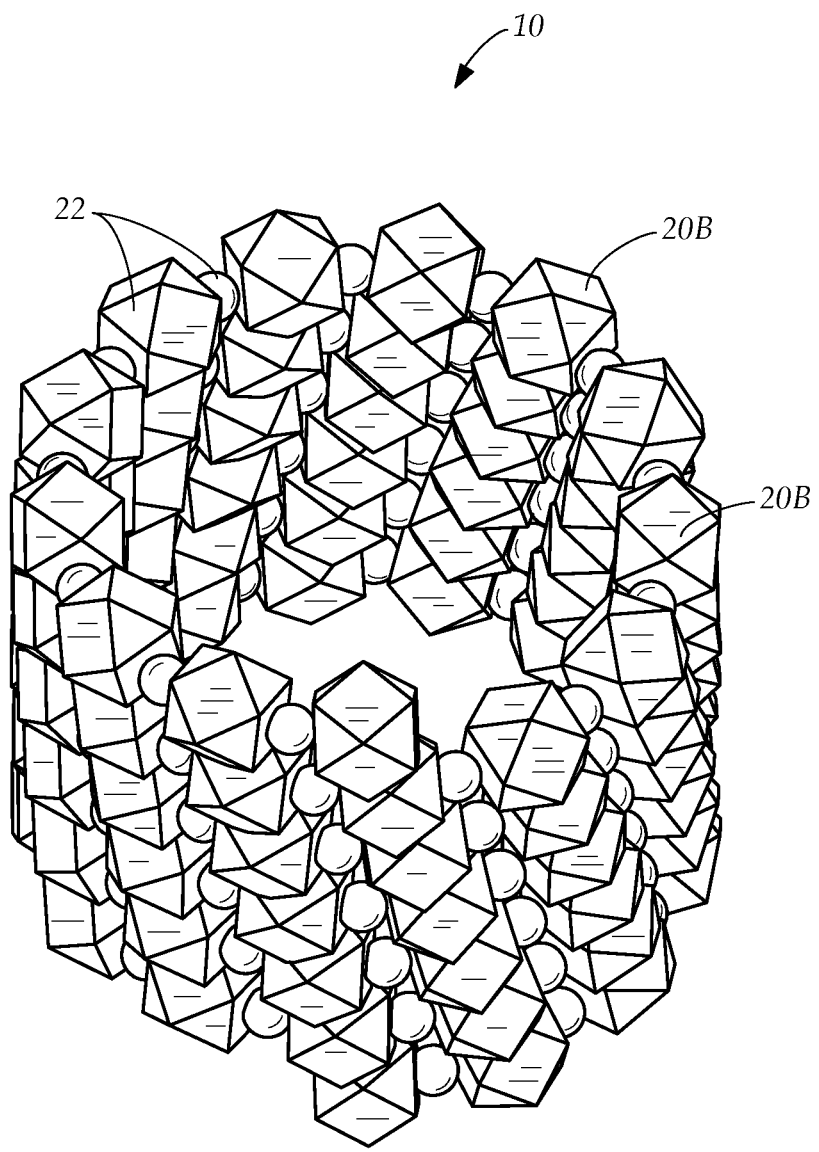
FIG. 8A is a perspective view of a further embodiment of the apparatus for identifying a stroller.
Figure 8B:
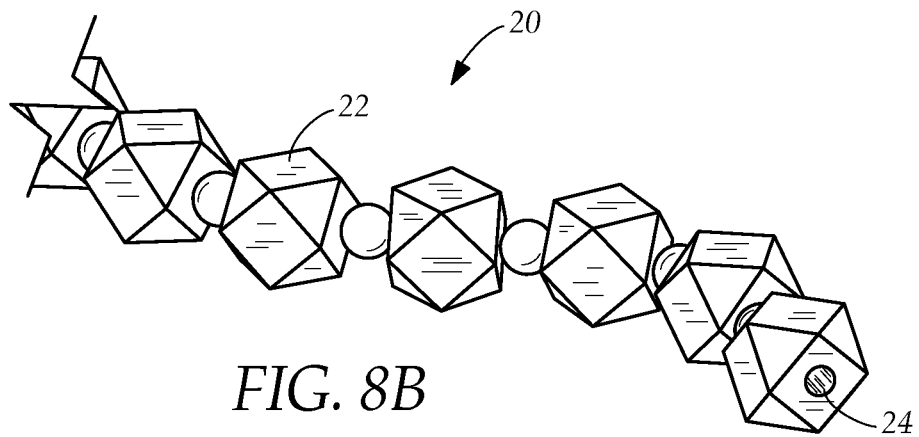
FIG. 8B is a perspective view of a segment in detail of the further embodiment of the apparatus.
Figure 8C:
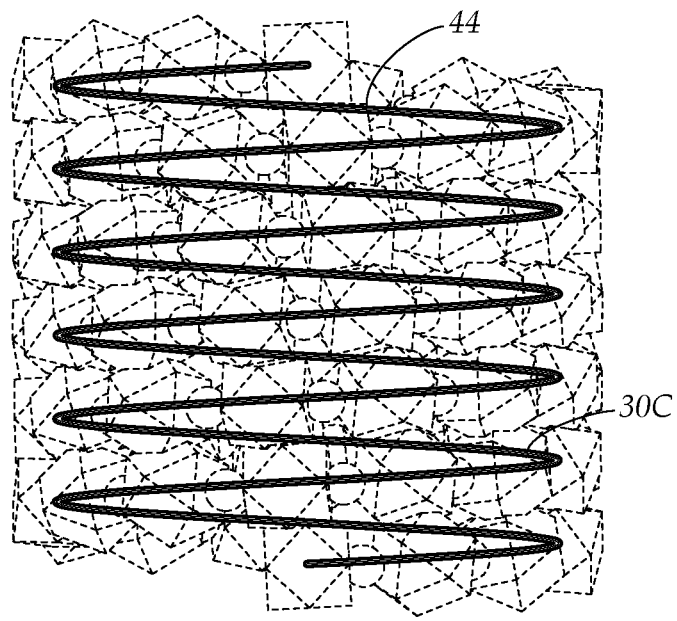
FIG. 8C is a perspective view of an internal band of the further embodiment of the apparatus shown in outline.

FIGS. 8A-8C illustrate a further example embodiment of the apparatus 10. In this embodiment, the band 30C is covered by a plurality of ornaments 20B. In this example embodiment, the ornaments are beads 22 strung on the band. It is known to those of ordinary skill that the beads are not limited by shape or size, the beads having a bore 24 therethrough operative for inserting the band therein. The beads are not limited by color but are preferably brightly colored and have a shiny surface.

Figure 9:
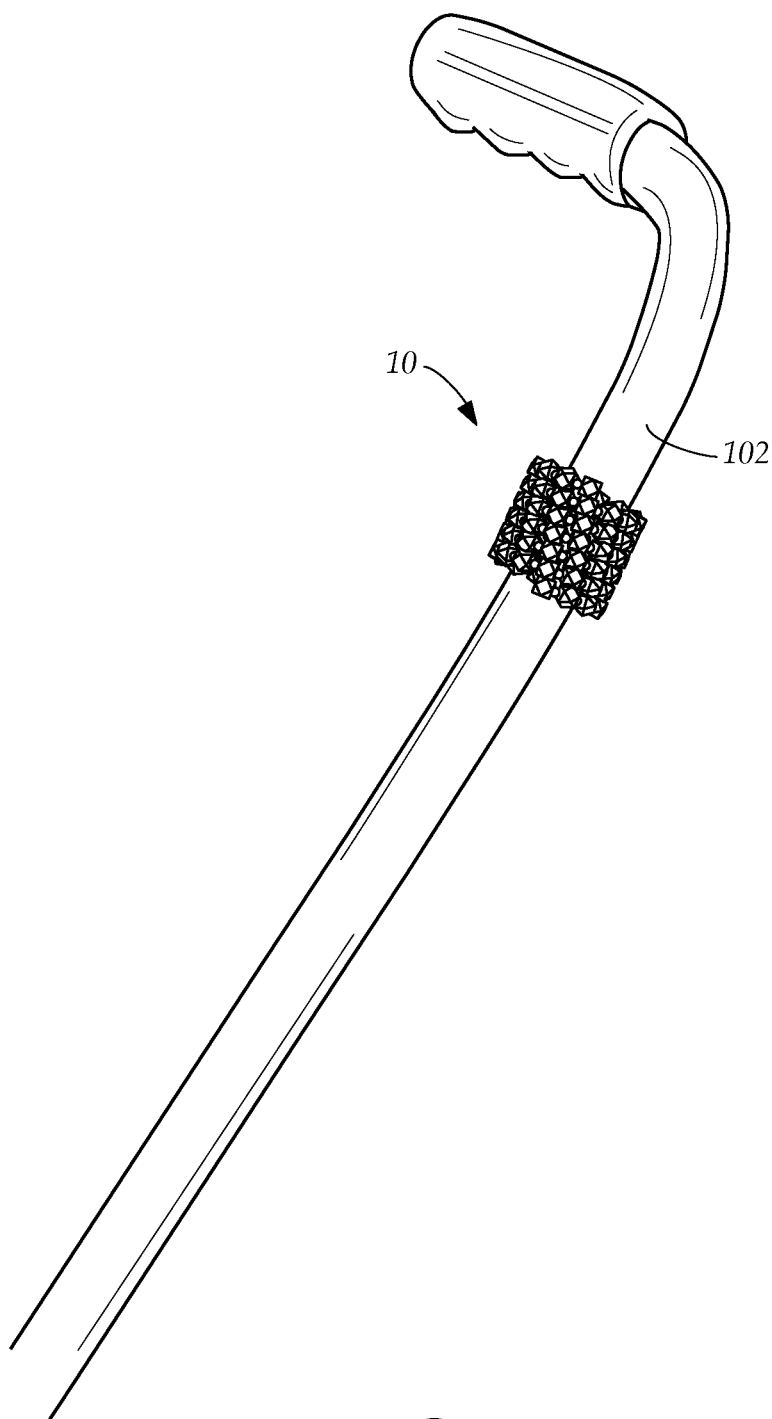
FIG. 9 is a perspective view of the further embodiment of the apparatus for identifying a stroller attached to the stroller handle.

The band is a coiled spring 44 inserted through the bores 24 of the beads 22 and is substantially internal to the ornaments 20B. The apparatus 10 attaches to the stroller handle 102 by the tension of the internal coiled spring as shown in FIG. 9.

Figure 10:
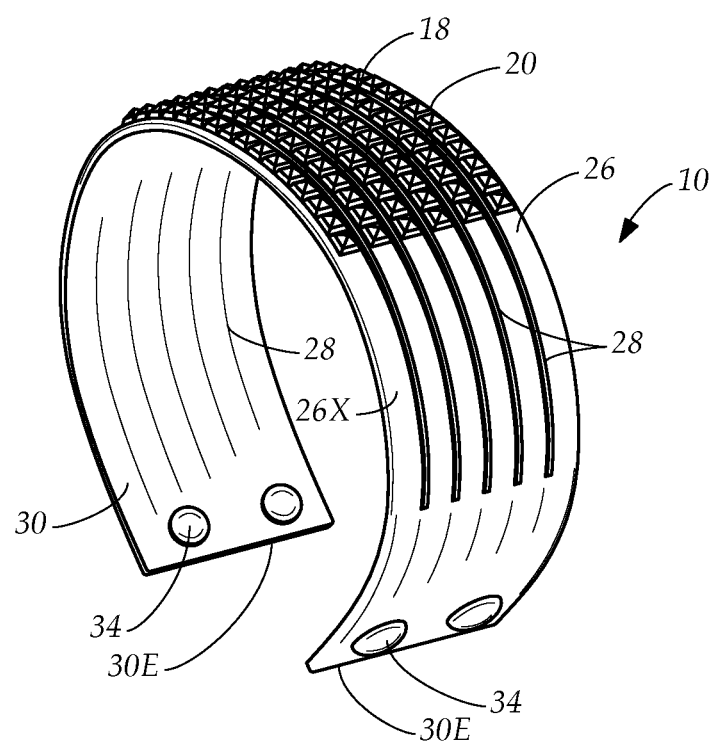
FIG. 10 is a perspective view of yet another embodiment of the apparatus for identifying a stroller.

FIG. 10 shows yet another example embodiment of the apparatus having a plurality of ornaments arrayed in a plurality of rows. In this example embodiment, the band 30 has a plurality of slits 28 producing a plurality of strips 26. In the illustration, each strip has an outside surface 26X having a plurality of ornaments 20 attached. In the illustration, each strip 26 has a row of faux gems 18 as ornaments, It is understood by those of ordinary skill that the attached ornaments are not limited to faux gems, and further, each strip is capable of having a row 18 of ornaments different from an adjacent strip. As a non-limiting example, the row of ornaments form a name of the stroller's owner.

The band 30 having a pair of ends 30E has at least one snap 34 adjacent to each end for securing the apparatus 10 to the stroller. In this further embodiment, the band 20 attaches snugly to the stroller handle as further shown in FIG. 11A and FIG. 11B.

Figure 11A:
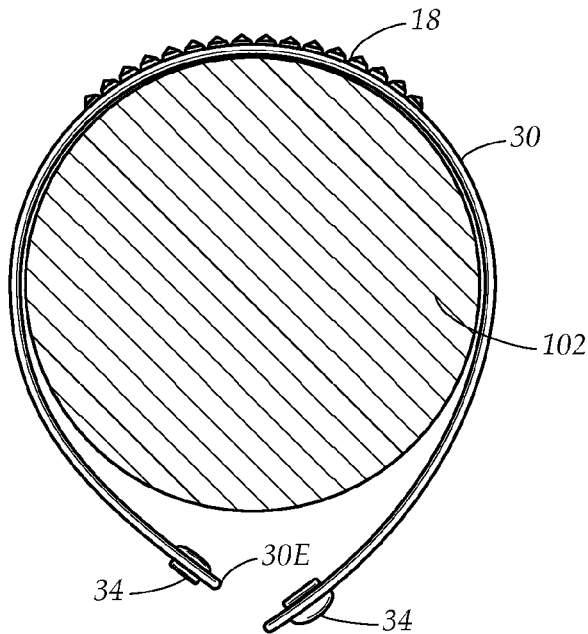
FIG. 11A is a top plan view of yet another example embodiment of the apparatus for identifying a stroller as the apparatus engages the stroller handle shown in cross section.
Figure 11B:
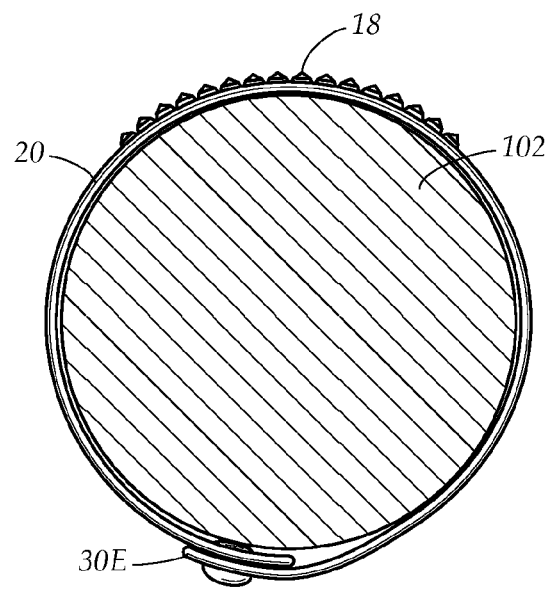
FIG. 11B, similar to FIG. 11A, is a top plan view of yet another example embodiment of the apparatus for identifying a stroller as the apparatus attaching to the stroller handle shown in cross section.

In FIGS. 11A and 11B, the band 30 engages the stroller handle 102, shown in cross-section. The ends 30E of the band overlapping and the at least one snap 34 closes, holding the band in place by friction created by the snug fit.

It is further understood that the band of the apparatus attaches to the stroller by spring tension, elasticity or friction as non-limiting examples. Further that when the apparatus attaches by elasticity or friction, the ends of the band are fastened by a fastener, such as, but not limited to clasps, snaps, hook and loop fasteners, buckles, pins, clips, hook and eye fasteners, buttons, studs, zippers, ribbons, fastening frogs and rivets.

A method for identifying the stroller 100 using the apparatus 10, as shown in FIG. 1 comprises selecting at least one distinctive ornament 20 for attaching to the apparatus, the ornament operative for providing immediate recognition. The ornament selectively couples to the band as shown in FIGS. 7A-7B and FIGS. 11A-11B, forming the apparatus providing immediate recognition of a particular stroller. Referring again to FIG. 1, at least one apparatus 10 attaches to the stroller 100, attaching to the stroller handle 102 at a visible position.

When the stroller 102 has a pair of handles, a plurality of apparatuses 10 can attach to the stroller. The handles each having a vertical portion 106 and a horizontal portion 104 and the apparatuses can attach on the vertical portions and horizontal portions of the handles, providing easy immediate recognition of the stroller.

When the stroller 102 has a pair of separate handles 102, the apparatus having the elastic strip as a band attaches by stretching the elastic strip over the handle and releasing the elastic strip, the elastic strip contracting around the handle situating the apparatus at the visible position.

Figure 5:
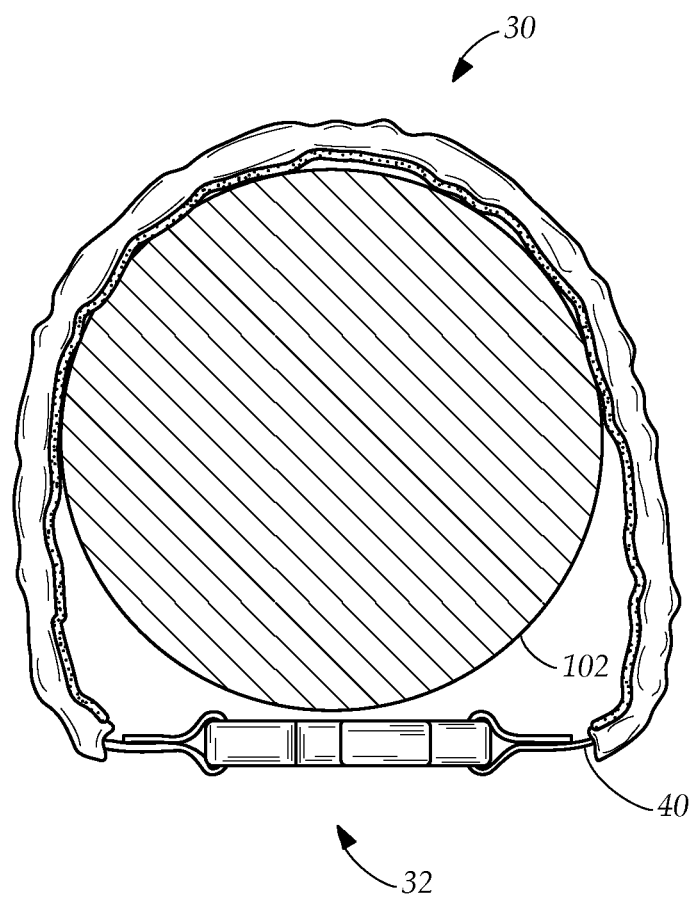
FIG. 5 is a top plan view of another example embodiment of the apparatus for identifying a stroller attaching to the stroller handle shown in cross section.

When the stroller 102 has a single handle that has a pair of vertical portions joined by a top horizontal portion, the band 30 has a clasp 32 as shown in FIG. 5. The apparatus attaches to the handle 102 of the stroller by opening the clasp 32, wrapping the band 30 around the handle and closing the clasp, the elastic strip 40 contracting around the handle situating the apparatus at the visible position. It is understood that this embodiment attaches to any type of stroller handle, not just the single handle style having a pair of vertical portions joined by a top horizontal portion.

When the band 30 has a plurality of bistable spring bands 42A, 42B, as shown in FIG. 3A-3B, the apparatus attaches to the handle 102 by slapping the band 30 against the handle, the spring bands operative for curving around the stroller handle releasing tension within the band when applied to the handle, the spring bands biased inwardly operative for coiling around the stroller handle.

If a user wishes to change the ornament to a second ornament that coordinates with clothing worn by the user or a child occupying the stroller, the user continues with detaching the apparatus from the stroller handle, selectively detaching a first ornament from the band, selecting the second distinctive ornament and selectively coupling the second ornament to the band. The user then reattaches the apparatus to the stroller handle at a visible position.

Alternatively, the user allows the apparatus to remain on the stroller handle, selectively detaches the first ornament from the band, selects the second ornament and selectively couples the second ornament to the band. It is understood the step of selecting the second ornament can precede the step of detaching the first ornament within the inventive concept.

When the band 30 has an internal spring in a coil band 30C, as shown in FIG. 8C, the apparatus attaches to the handle 102 by uncoiling the band 30 against the handle, the spring operative for curving around the stroller handle releasing tension within the band when engaging the handle, the band 30 biased inwardly operative for coiling around the stroller handle as shown in FIG. 9.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an apparatus for identifying a particular baby stroller in a crowd of parked strollers. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for identifying and recognizing a particular stroller in a crowd of strollers, comprising:

selecting at least one distinctive ornament the ornament operative for providing immediate recognition by providing a distinctive visual cue;

selectively coupling the ornament to an elastic band, the elastic band having a rubberized layer on an inside surface, the band and ornament forming an apparatus;

attaching said apparatus to a particular stroller having a vertical handle, the stroller handle in the shape of an inverted "J", the handle having an unobstructed distal end, attaching to the stroller handle by stretching the band to accommodate the unobstructed distal end of the handle, placing the band over the distal end of the handle, and sliding the band until the band is at a visible position on the handle, relaxing the band until the band snuggly encircles the handle, the apparatus held in place by friction produced by the rubberized layer and the handle; and moving the particular stroller from a crowd of strollers after recognizing the apparatus on the particular stroller and selecting the particular stroller.

2. The method for identifying a stroller as described in claim 1, wherein the step of attaching at least one apparatus to a stroller having at least one handle is followed by the steps comprising:

detaching the apparatus from the stroller handle;

selectively detaching a first ornament from the band;

selecting a second distinctive ornament for attaching to an apparatus, the ornament operative for providing immediate recognition;

selectively coupling the second ornament to the band; and attaching the apparatus to a stroller handle at a visible position.

\* \* \* \* \*